United States Patent [19]

Okada et al.

[11] Patent Number: 4,756,605
[45] Date of Patent: Jul. 12, 1988

[54] LIQUID CRYSTAL SPECTACLES

[75] Inventors: Takao Okada; Takeaki Nakamura; Kimihiko Nishioka; Hiroyuki Yamamoto; Toshihito Kouchi; Hideo Tomabechi, all of Tokyo, Japan

[73] Assignee: Olympus Optical Co., Ltd., Tokyo, Japan

[21] Appl. No.: 820,667

[22] Filed: Jan. 21, 1986

[30] Foreign Application Priority Data

Feb. 1, 1985 [JP] Japan .................................. 60-18195
Feb. 1, 1985 [JP] Japan .................................. 60-18200

[51] Int. Cl.⁴ ............................ G02F 1/13; G02C 1/00
[52] U.S. Cl. ............................. 350/347 V; 350/347 R; 351/41; 351/44; 351/158
[58] Field of Search ............................. 351/41, 44, 158; 350/347 V, 347 R

[56] References Cited

U.S. PATENT DOCUMENTS

| 4,037,929 | 7/1977 | Bricot et al. | 350/336 |
| 4,190,330 | 2/1980 | Berreman | 350/331 R |
| 4,279,474 | 7/1981 | Belgorod | 350/331 R |

FOREIGN PATENT DOCUMENTS

| 2530039 | 1/1984 | France | 351/158 |
| 0100527 | 7/1980 | Japan | 351/158 |
| 0006214 | 1/1981 | Japan | 351/41 |
| 0081818 | 7/1981 | Japan | 350/347 V |
| 0050339 | of 1983 | Japan . | |
| 1563929 | 4/1980 | United Kingdom . | |
| 1589972 | 5/1981 | United Kingdom . | |
| 2163864 | 3/1986 | United Kingdom . | |
| 2168417 | 7/1986 | United Kingdom . | |

Primary Examiner—Stanley D. Miller
Assistant Examiner—Trong Quang Phan
Attorney, Agent, or Firm—Frishauf, Holtz, Goodman & Woodward

[57] ABSTRACT

A liquid crystal spectacle includes a pair of liquid crystal lenses and a frame holding the lenses. The frame has a pair of temples and a pair of ear pieces attached individually to the temples. Each ear piece houses a battery for supplying the voltage to the corresponding lens. Each temple houses a regulator circuit for regulating the voltage supplied from the battery to the lens, thereby controlling the refractive index of the lens.

10 Claims, 2 Drawing Sheets

LIQUID CRYSTAL SPECTACLES

BACKGROUND OF THE INVENTION

The present invention relates to spectacles featuring liquid crystal lenses.

If the focal adjustment function of the eyeballs deteriorates due to presbyopia or the like, the patient has conventionally used two pairs of spectacles with different focal lengths for the affected ranges of vision, as required. In this case, however, the user has had to take the trouble always to carry both types of spectacles for alternative use.

Conventionally, so-called bifocal spectacles have been developed whose lenses include a region of a shorter or longer focal length to be used for shorter or longer distances. In spectacles of this type, however, the eye can only focus on objects in the corrected visual field. Thus, the bifocal glasses cannot provide the large field of vision provided by ordinary glasses.

If the crystalline of a patient's eyeball suffering from cataract is removed, the patient must obtain several pairs of spectacles of different focal lengths and use them accordingly.

To solve these problems, there are provided such liquid crystal spectacles as are disclosed in, for example, Japanese Patent Publication No. 50339/83. These spectacles use variable-focus lenses (hereinafter referred to as liquid crystal lenses) which take advantage of a property of a liquid crystal such that its transmission factor is varied by controlling the applied voltage. The orientation of the liquid crystal molecules is controlled by externally applying an electric or magnetic field to a liquid crystal cell including the molecules oriented in one direction, thereby continuously changing the refractive index of the liquid crystal. The refractive index of this liquid crystal lens is variable, so that its focal length can be set freely.

A problem in the practical use of the liquid crystal spectacles lies in the manipulation of a drive circuit and a power source for applying voltage to the liquid crystal lenses. To cope with this, separate-type liquid crystal spectacles have been proposed. According to these spectacles, the power source and drive circuit are housed in a case independent of the spectacle body frame. In this case, the user must take the trouble to carry the case separately whenever he or she uses the glasses. When pocketing the case, for example, a cord or cords must connect it with the lenses. The cords are troublesome in handling and mar the appearance of the spectacles. Also, they are liable to pick up undesired external noise, exerting a bad influence upon the liquid crystal lenses. In the absence of a suitable pocket, moreover, the user must carry the case in his hand. Thus, the spectacles are unieldy to carry.

SUMMARY OF THE INVENTION

The present invention is contrived in consideration of these circumstances, and is intended to provide liquid crystal spectacles high in portability and easy to use.

In order to achieve the above object, a pair of spectacles according to the present invention comprises a pair of liquid crystal lenses whose refractive indices change when a voltage is applied to the lenses, thereby orientating the liquid crystal molecules in a different direction, a frame holding the lenses, power supply means for supplying the voltage to the lenses, and regulating means for regulating the voltage supplied from the power source means to the lenses to control the refractive indices of the lenses, the power source means and the regulating means being contained in the frame.

BRIEF DESCRIPTION OF THE DRAWINGS

FIGS. 1 to 3 show a pair of spectacles according to an embodiment of the present invention, in which FIG. 1 is a general perspective view of the spectacles, FIG. 2 is a sectional view of an earpiece, and FIG. 3 is a diagram showing a drive circuit and a cross section of a crystal lens;

DETAILED DESCRIPTION OF THE PREFERRED EMBODIMENTS

An embodiment of the present invention will now be described in detail with reference to the accompanying drawings.

Figure 1:
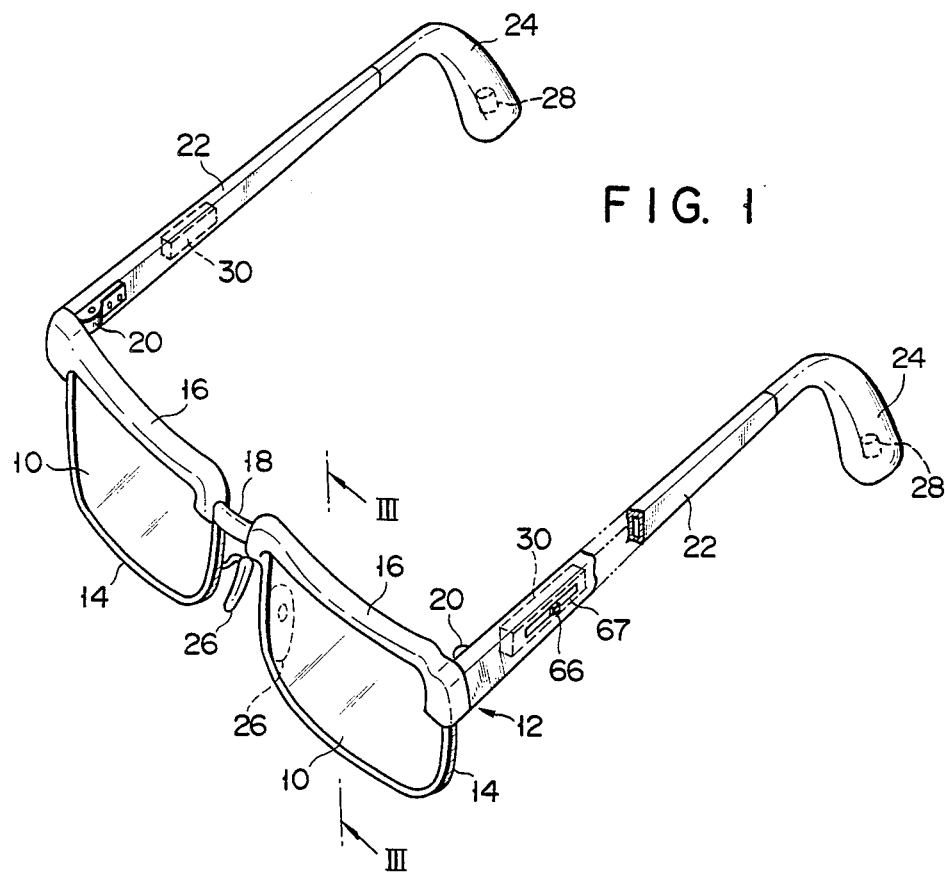

As shown in FIG. 1, a pair of spectacles comprises a pair of liquid crystal lenses 10 and frame 12 supporting the same. Frame 12 includes rims 14 each supporting the bottom edge and both side edges of each corresponding lens 10, brows 16 coupled to rims 14 and each holding the top edge of its corresponding lens 10, and bridge 18 connecting brows 16. One end of temple 22 is swingably attached to each brow 16 by means of hinge 20. Earpiece 24 is attached to the other end of each temple 22. Nose pad 26 is mounted on each rim 14.

Each earpiece 24 contains therein dry battery 28 as a power source for supplying voltage to each corresponding liquid crystal lens 10. Temples 22 are each formed of a metal pipe and contain regulator circuit 30 for adjusting the refractive index of the corresponding lens 10.

Figure 2:
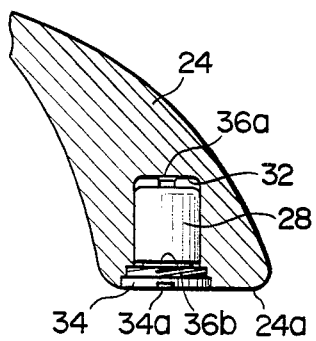

As shown in FIG. 2, each earpiece 24 is formed with a blind hole which constitutes holder 32 for containing battery 28. Holder 32 opens to bottom surface 24a of earpiece 24, and lid 34 is screwed in the opening of the hole. Lid 34 is formed with slot 34a in which the edge of a coin or fingernail can be fitted. Contact 36a in touch with one electrode of battery 28 is provided at the bottom of holder 32, while contact 36b to touch the other electrode of battery 28 is formed on the inside of lid 34.

Figure 3:
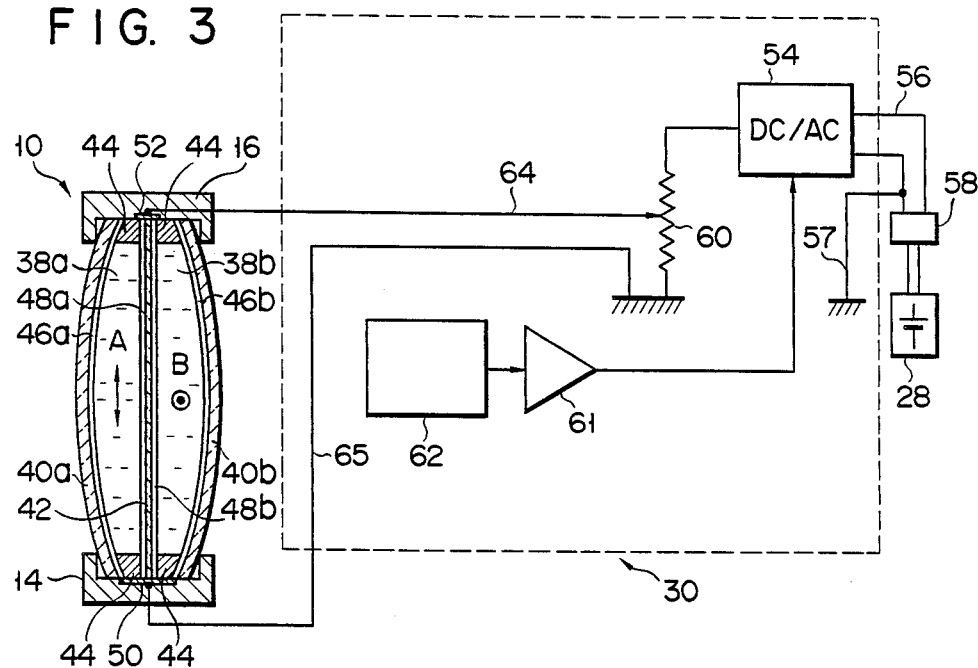

Referring to FIG. 3, one liquid crystal lens 10 and its corresponding regulator circuit 30 will now be described. In FIG. 3, lens 10 is shown in a sectional view taken along line III—III of FIG. 1.

Basically, lens 10 comprises two liquid crystal layers 38a and 38b. More specifically, it includes a pair of concave transparent plates 40a and 40b facing each other, and flat transparent plate 42 disposed between plates 40a and 40b and dividing the space between them in two. The peripheral edges of plates 40a and 40b are coupled to that of plate 42 by means of spacers 44. Transparent electrodes 46a and 46b are fixed to the inside of plates 40a and 40b, respectively. Transparent electrode 48a is fixed to that surface of plate 42 on the side of plate 40a, and transparent electrode 48b on the other surface of plate 42. Outside electrodes 46a and 46b are electrically connected by means of conductor 50, and inside electrodes 48a and 48b by means of conductor 52.

Liquid crystal layers 38a and 38b are sealed in between electrodes 46a and 48a and between electrodes 46b and 48b, respectively.

When no voltage is applied to any of electrodes 46a, 46b, 48a and 48b, the liquid crystal molecules of layers 38a and 38b are arranged parallel to transparent plate 42. Also, they are generally oriented at right angles to incident light and to one another by rubbing or the like. More specifically, the liquid crystal molecules of layer 38a are oriented vertically as indicated by arrow A, while those of layer 38b are oriented at right angles to the drawing plane of FIG. 3, as indicated by symbol B.

When voltage is applied between electrodes 46a and 48a and between electrodes 46b and 48b, the liquid crystal molecules of liquid crystal layers 38a and 38b gradually change their direction of orientation toward becoming perpendicular to transparent plate 42. Thus, the refractive indices of layers 38a and 38b, with respect to incident light, can be changed in succession.

Regulator circuit 30 includes DC-AC converter unit 54 which is connected to battery 28 via a pair of conducting wires 56 and 57 and switch 58. Wire 57 is connected to an earthing point (reference voltage point) in each temple 22. Unit 54 is connected with variable resistor 60 and also with IC 62 for temperature detection through amplifier 61. A DC supply voltage from battery 28 is fed through switch 58 and wires 56 and 57 to converter unit 54, where it is converted into an AC voltage output, and then applied to one end of resistor 60. The AC voltage is delivered from a movable end of resistor 60 to electrodes 48a and 48b by means of conducting wire 64 and conductor 57. A reference voltage is applied to electrodes 46a and 46b by means of conductor 50 and conducting wire 65. IC 62 transmits a detection output responsive to the ambient temperature to converter unit 54 via amplifier 61, thereby changing the AC voltage output of unit 54 in accordance with the detected temperature.

As shown in FIG. 1, variable resistor 60 extends in the longitudinal direction of temple 22. Knob 66 is attached to the movable end of resistor 60, projecting outward through slit 67 which is formed in temple 22. Thus, the focal length of liquid crystal lens 10 can be adjusted by controlling the voltage applied to the electrodes through external operation of knob 66. Switch 58 can also be operated from the outside. It is to be understood that the other lens and its corresponding regulator circuit are constructed in the same manner as aforesaid.

Generally, the eyes of a patient are different in strength, so the refractive indices of the two liquid crystal lenses must be adjusted separately.

To replace battery 28, lid 34 is first removed from earpiece 24 by fitting the edge of a coin or fingernail into slot 34a of lid 34 and then turning the lid. After battery 28 is replaced with a new one, lid 34 is fixed again to earpiece 24.

According to the liquid crystal spectacles constructed in this manner, the regulator circuits and the power sources for applying voltage to the liquid crystal lenses are housed in the frame. Therefore, the user need not carry a conventional case independent of the spectacle body frame. Thus, the spectacles are compact, easy to handle, and highly portable. Without connecting cords and other attachments exposed to the outside, moreover, they are more attractive in external appearance. In addition, since each temple houses the same components, the spectacles are evenly balanced in terms of weight.

Each temple, containing the regulator circuit, is formed of a metal pipe, and part of each conducting wire for leading the voltage from the power source to the liquid crystal lens is electrically connected to the temple. Therefore, the temple is kept at the reference potential, thereby shielding converter unit 54, variable resistor 60, IC 62 for temperature detection, amplifier 61, and wires 64 and 65 therein from undesired external noise. Thus, it is possible to prevent external noise from mixing with the focal adjustment voltage applied to the lens, or from being superposed on the output of IC 62. Accordingly, the focal length of the liquid crystal lens can be set accurately and stably.

It is to be understood that the present invention is not limited to the embodiment described above, and that various changes and modifications may be effected therein by one skilled in the art without departing from the scope or spirit of the invention. In the above embodiment, for example, two independent power sources are used individually for the right and left liquid crystal lenses. Alternatively, however, a voltage may be applied to the regulator circuits by means of a single power source. In this case, if only one battery were used, the spectacles would feel unbalanced to the user. Therefore, a storage facility for a spare battery ensures balance as well as enhancing convenience by allowing a spare battery to be available. Moreover, the refractive indices of both lenses may be adjusted by means of a single regulator circuit. In this case, the two lenses have the same refractive index.

Figure 4:
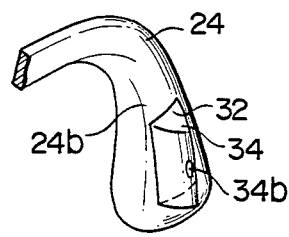
FIG. 4 is a perspective view showing a first modification of the earpiece.

The holder of the power source may be constructed as shown in FIG. 4. According to this modification, holder 32 opens to lateral face 24b of earpiece 24. The opening of holder 32 is closed by lid 34 which is rockably supported by earpiece 24. In replacing power source 28, lid 34 is rocked to open holder 32 by hooking knob 34 with a fingernail or the like.

Figure 5:
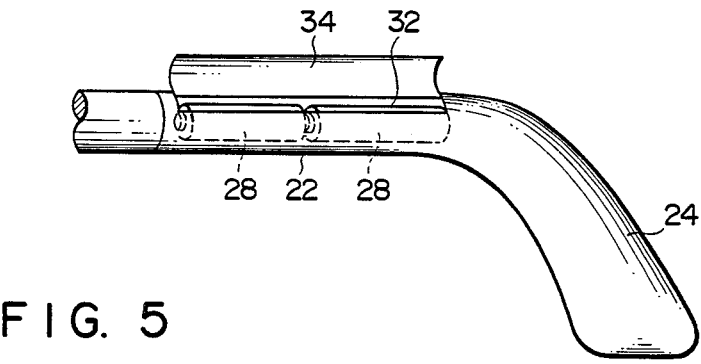
FIG. 5 is a side view showing a second modification of the earpiece.

According to a modification shown in FIG. 5, holder 34 is formed long at the rear end portion of temple 22. Holder 32 opens upward, and lid 34 is singably attached to its opening portion.

Lid 34 is taken off when power sources 28, such as dry batteries, in holder 32 are to be replaced. Since lid 34 is provided on the top side of temple 22, power sources 28 will not drop from holder 32 even when lid 34 is removed.

Figure 6:
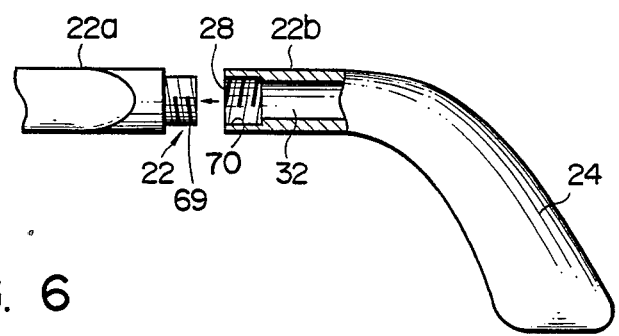
FIG. 6 is a cutaway side view showing a third modification of the earpiece.

According to a modification shown in FIG. 6, temple 22 is divided into two portions 22a and 22b in the middle. Front and rear portions 22a and 22b are coupled together by engaging male and female screws 69 and 70 formed at the facing ends of portions 22a and 22b, respectively. Holder 32 with female screw 70 as its opening portion is formed in portion 22b.

Rear portion 22b is removed from front portion 22a by being rotated. Thus, a power source can easily be taken out of holder 32 to be replaced with a new one. After the new power source is set in holder 32, male screw 69 of front portion 22a is screwed into female screw 70 of rear portion 22b to couple portions 22a and 22b together again.

What is claimed is:

1. A pair of liquid crystal spectacles, comprising:
   a pair of liquid crystal lenses whose refractive indices change when a voltage is applied to the lenses, wherein liquid crystal molecules in the lenses are oriented in a different direction than that in the absence of said voltage;

a frame holding the lenses;

power supply means, contained in the frame, for supplying the voltage to the lenses; and regulating means for regulating the voltage supplied from the power supply means to the lenses to control the refractive indices of the lenses, said frame including a pair of rims and brows for holding the liquid crystal lenses, a pair of temples swingably attached at one end to the brow, and a pair of ear pieces attached individually to the other ends of the temples, and said regulating means is housed in the temples, each of said temples being formed of a metal pipe for shielding said regulating means from external electrical noise.

2. The liquid crystal spectacles according to claim 1, wherein said regulating means includes wires for conducting the voltage from the power supply means to the liquid crystal lenses, said wires being electrically connected to the temples.

3. The liquid crystal spectacles according to claim 2, wherein said regulating means includes a variable resistor for varying the voltage supplied from the power supply means to the liquid crystal lenses, said resistor having a movable end exposed to the outside of the temple and adapted for external operation.

4. The liquid crystal spectacles according to claim 1, wherein said regulating means includes a pair of regulator circuits for separately regulating the voltage applied to the lenses, said regulator circuits being housed in the temples, respectively.

5. The liquid crystal spectacles according to claim 4, wherein said power supply means includes a pair of power sources for separately supplying the voltage to the lenses.

6. The liquid crystal spectacles according to claim 5, wherein each of said earpieces includes a holding portion, and said power sources are housed in the holding portions, respectively.

7. The liquid crystal spectacles according to claim 6, wherein each of said holding portions opens to the outside of the earpiece, and said frame includes lids removably attached to the openings of the holding portions, respectively.

8. The liquid crystal spectacles according to claim 5, wherein each of said temples includes a holding portion, and said power sources are housed in the holding portions, respectively.

9. The liquid crystal spectacles according to claim 8, wherein each of said holding portions opens to the outside of the temple, and said frame includes lids removably attached to the openings of the holding portions.

10. A pair of liquid crystal spectacles, comprising:

a pair of liquid crystal lenses whose refractive indices change when a voltage is applied to the lenses, wherein liquid crystal molecules in the lenses are oriented in a different direction than that in the absence of said voltage;

a frame holding the lenses;

power supply means, contained in the frame, for supplying the voltage to the lenses; and regulating means for regulating the voltage supplied from the power supply means to the lenses to control the refractive indices of the lenses, said power supply means and said regulating means being housed in the frame, and said frame including a shielding portion for containing the regulating means and for shielding the regulating means from external electrical noise.

* * * * *

UNITED STATES PATENT AND TRADEMARK OFFICE
CERTIFICATE OF CORRECTION

PATENT NO. : 4,756,605
DATED : July 12, 1988
INVENTOR(S) : OKADA

It is certified that error appears in the above-identified patent and that said Letters Patent is hereby corrected as shown below:

Title page, right-hand column, under "Foreign Patent Documents", "2168417" should read -- 2169417 --

In the Abstract, last line, after "lens" insert
-- while shielding the regulator circuit from outside electrical noise --

Signed and Sealed this

Thirteenth Day of June, 1989

*Attest:*

DONALD J. QUIGG

*Attesting Officer*     *Commissioner of Patents and Trademarks*